Patented Mar. 14, 1950

2,500,160

UNITED STATES PATENT OFFICE 2,500,160

SYNTHETIC LUBRICANTS

Francis M. Seger, Pitman, and Alexander N. Sachanen, Woodbury, N. J., assignors to Socony-Vacuum Oil Company, Incorporated, a corporation of New York No Drawing. Application February 7, 1948, Serial No. 6,993

8 Claims. (Cl. 260—669)

This invention relates to the condensation of mono-olefinic hydrocarbons, and is more particularly concerned with the provision of a new process for effecting the interaction of mono-olefinic hydrocarbons containing at least five carbon atoms per molecule with styrene. This invention also comprehends the reaction products produced by the above condensations and the lubrication of relatively moving surfaces by the use of certain of these reaction products, either alone or in admixture with other lubricants or improving agents.

It is well known in the art to effect a union between molecules of unsaturated hydrocarbons to produce compounds, called polymers, the molecular weights of which are multiples of the molecular weights of the original hydrocarbons. The operation is called polymerization and the condition of temperature, pressure, etc., are called polymerizing conditions.

As is well known to those familiar with the art, polymerization reactions of the type referred to hereinbefore, may be conducted at relatively high temperatures and pressures, or may be carried out at lower temperatures and pressures, in the presence of substances or of mixtures of substances, that promote the polymerization reaction. These substances are referred to as polymerization catalysts.

Several substances have been proposed as polymerization catalysts, and among the most widely used are phosphoric acid, surfuric acid, hydrogen fluoride, aluminum chloride, boron trifluoride and solid alumina-silica absorbents. In polymerization processes involving the use of these substances at catalysts, the olefinic hydrocarbons are polymerized into polymeric olefinic hydrocarbons, the molecular weight of which, depending upon the conditions of polymerization, may vary within very broad limits from dimers to polymers containing many thousands of carbon atoms. These products may be used as fuels, lubricants, plastics, etc., depending upon their molecular weights, and other characteristics.

It is also well known to those familiar with the art, that ethylene and conjugated diolefinic hydrocarbons, such as butadiene, are readily polymerized in the presence of peroxides or oxygen. This has been embodied in numerous processes which are of considerable commercial importance in the production of high molecular weight plastics and elastomers. In contrast to the polymers formed by the polymerization of ethylene or of conjugated diolefinic hydrocarbons in the presence of acidic polymerization catalysts, the products obtain when peroxides or oxygen are utilized as polymerization catalysts are predominantly high molecular weight polymers.

In accordance with United States Patent application Serial No. 673,892, filed June 1, 1946, by Seger and Sachanen, it has recently been found that mono-olefinic hydrocarbons containing at least five carbon atoms can be condensed with organic peroxides. In accordance with this patent application, it is disclosed that by using relatively large amounts of organic peroxides, mono-olefinic hydrocarbons or their polymers actually react with the organic peroxides to produce compounds containing structural elements of the organic peroxides.

It has now been discovered that generally similar reactions can be caused to occur between mono-olefinic hydrocarbons containing at least five carbon atoms and styrene.

Accordingly, it is an object of the present invention to provide for effecting the condensation of mono-olefinic hydrocarbons containing at least five carbon atoms with styrene. A very important object is to afford a process for the production of synthetic lubricating oils. Another important object is to provide a method of lubricating relatively moving surfaces by maintaining between them a film of the products formed by the aforesaid process, either alone or in admixture with other lubricants or improving agents. Still other objects and advantages of the present invention will become apparent to those skilled in the art from the following description.

Broadly stated, the present invention provides a process for effecting the condensation of mono-olefinic hydrocarbons having at least five carbon atoms per molecule, with styrene, which comprises reacting the mono-olefinic hydrocarbon reactants with styrene, under conditions of reaction to be described in detail hereinafter.

The mono-olefinic reactants of this invention are normally liquid, straight-chain, 1-olefins ranging from pentene-1 to dodecene-1, inclusive. It must be clearly understood that by straight-chain 1-olefins is meant olefins containing the double bond in the alpha position and having a normal structure. In accordance with this invention the most desirable synthetic oils are produced from straight-chain 1-olefins containing not less than eight nor more than twelve carbon atoms per molecule.

The state of purity of the straight-chain 1-olefin charge does not appear to be especially critical. Although it is desirable to have a starting material which contains as large a percentage of the above-described 1-olefins as possible, it is permissible to have present lesser amounts of other olefins and even of other hydrocarbon materials. In general, the charge stock should preferably not contain more than about twenty percent by weight of hydrocarbons other than the desired straight-chain 1-olefins. However, in the practice of this invention it has been found that charge stocks containing as much as fifty percent by weight of paraffinic hydrocarbons, with the balance being the desired straight-chain 1-olefins, are entirely satisfactory for the purpose.

In many instances, in commercial operation, it will be found desirable to use technical grades of such olefins as octene-1 or decene-1. Mixed olefinic materials derived from the thermal cracking of wax or from the Fischer-Tropsch process constitute satisfactory charging stocks. In this connection, it must be noted that it is suspected that substantially straight-chain 1-olefins having between about five and about twelve carbon atoms per molecule, i. e., 1-olefins which are branched, but in which the length of side chain or chains is short relative to the length of the main chain, are also suitable, although less preferred charge stocks for the purposes of the present invention. However, in view of the fact that such olefins are unavailable, no test data can be adduced to confirm this suspicion.

Tests indicate that when relatively pure, single olefins are used, they should preferably contain not less than seven nor more than eleven carbon atoms per molecule, although mixtures of olefins containing an average of as few as six or as many as twelve carbon atoms per molecule are entirely satisfactory.

In general, and in accordance with our invention, the amounts of styrene to be used are relatively large. In contrast to polymerization reactions of the prior art, which involve conjugated diolefinic hydrocarbons or ethylene, and wherein organic peroxides have been used and have functioned exclusively as catalysts, it has been found that in the present process, styrene and the mono-olefinic hydrocarbon reactant form a copolymer, the production of which may or may not have been initially promoted by styrene. Accordingly, the yields and the nature of the products obtained in the process of the present invention depend upon the amounts of styrene employed. For instance, when a mono-olefinic hydrocarbon containing at least five carbon atoms per molecule is reacted with styrene, in accordance with our process, polymers containing aromatic radicals and other structural fragments of styrene will be formed. Viewed in this light, our process is one involving both polymerization and the broader and more comprehensive reaction-condensation.

Good results may be obtained using proportions as low as one mol of styrene to fifty mols of a given mono-olefinic hydrocarbon reactant. In such cases, however, much of the mono-olefinic hydrocarbon reactant is usually recovered unreacted. On the other hand, excessive proportions of styrene result in waste of this relatively expensive material without achieving corresponding gains in the desired product. Therefore in this process, it appears expedient to employ styrene in amounts varying between about 0.6 mol and about 0.25 mol per mol of mono-olefinic hydrocarbon reactant.

The reaction process of this invention is rather simply accomplished by merely mixing the reactants in a shaker bomb type of reactor, replacing the air therein by an inert atmosphere of nitrogen or the like, and applying the desired pressure and temperature for sufficient length of time to complete the reaction.

Preferred conditions of reaction are 500–700° F. under autogenous pressures which usually are in the neighborhood of 300 to 600 pounds per square inch, although they may be either higher or lower. Reaction times will vary depending upon the particular reactants being used but are generally between 1 and 10 hours. Temperatures below 500° F. may be used, but at lower temperatures the yield of reaction product is generally lower, and the viscosity index of the products is generally not as satisfactory.

In accordance with the process of the present invention and depending upon the conditions of operation and the nature of the mono-olefinic hydrocarbon reactants, various condensation products, from comparatively low-boiling to high-boiling fractions, can be synthesized. Thus, in our process, it is possible to produce fractions boiling within the range of those of lubricating oils, i. e., above 700° F. These products are of particular interest and importance. For example, synthetic lubricating oils obtained in accordance with our process have high viscosity indices, of the order of 100 or more, and the pour points may be low. In contrast to synthetic lubricating oils obtained in the processes of the prior art involving solely the polymerization of olefinic hydrocarbons, those of the present invention contain not only paraffinic chains but also other structural elements, for example, aromatic rings, which may affect the properties, particularly the stability, of the synthetic lubricating oils produced. Further, the synthetic lubricating oils synthesized by the alkylation of aromatics with olefinic hydrocarbons or chlorinated alkanes will differ materially from those of our invention due to the very nature of the reactions involved. Thus, as is well known, the processes involving alkylation reactions utilize strong catalysts which induce a series of side reactions, such as cracking, isomerization, etc. On the other hand, in our process, the reaction is effected under conditions whereby side reactions, if any, are kept to a minimum, and the temperature conditions are not severe. Accordingly, the utilization of our process for the manufacture of synthetic lubricating oils must be considered a preferred, but nevertheless non-limiting, embodiment of our invention.

As stated hereinbefore, when our process is operated to produce synthetic lubricating oils, normal alpha-mono-olefinic hydrocarbons containing between about seven and about twelve carbon atoms per molecule are preferred. From the standpoint of obtaining a product having optimum lubricating properties, we have found that normal alpha-mono-olefinic hydrocarbons containing about ten carbon atoms per molecule are to be especially preferred as reactants.

In general, in accordance with this invention, the temperatures used vary between about 500°

F. and about 700° F. The pressure to be employed depends upon the temperature used, and ordinarily a pressure sufficient to maintain the reactants in substantially the liquid phase at the temperatures employed is adequate. The time of reaction depends, of course, upon the temperature, the nature of the reactants employed, and to a certain extent, upon the pressure. In general the higher the temperature employed, the shorter the reaction time required, the criterion used being the time required at a given reaction temperature to effect condensation, and more specifically to assure substantially complete consumption of the styrene.

could be removed by filtration. It had the following characteristics:

Viscosity at 100° F., centistokes _____ 217.7
Viscosity at 210° F., centistokes _____ 17.83
Viscosity at 100° F., Saybolt seconds ___ 1005.8
Viscosity at 210° F., Saybolt seconds ___ 98.12
Viscosity index _____ 98.6

A series of additional runs were made in the same manner but using varying proportions of styrene and decene-1, under varying conditions. The results are indicated in the following table:

*Table I*

| Styrene: | | | | | | | | | |
|---|---|---|---|---|---|---|---|---|---|
| grams | 208 | 108 | 52 | 156 | 78 | 13 | 7 | 52 | 26. |
| mols | 2.0 | 1.0 | 0.5 | 1.5 | 0.75 | 0.125 | 0.066 | 0.5 | 0.25. |
| Olefin | Decene-1 | Decene-1 | Decene-1 | Decene-1 | Decene-1 | Decene-1 | Decene-1 | Decene-1 | Decene-1 |
| grams | 70 | 140 | 280 | 840 | 860 | 280 | 280 | 280 | 280. |
| mols | 0.5 | 1.0 | 2.0 | 6.0 | 6.0 | 2.0 | 2.0 | 2.0 | 2.0. |
| Atmosphere | $N_2$ | $N_2$ | Air | $N_2$ | $N_2$ | $N_2$ | $N_2$ | $N_2$ | $N_2$. |
| Temp., °F | 620 | 610 | 630 | 620 | 600 | 600 | 600 | 660 | 700. |
| Time, hours | 10 | 10 | 10 | 9½ | 10½ | 9 | 10½ | 10 | 5. |
| Max. press., lbs./sq. in | 300 | 500 | 430 | 500 | 400 | 350 | 450 | 400 | 900. |
| Distillate: | | | | | | | | | |
| grams | 56 | 71 | 81 | 269 | 348 | 128 | 171 | 91 | 111. |
| Grav | 0.8978 | 0.8189 | 0.7941 | 0.7758 | 0.7527 | 0.7612 | 0.7495 | 0.7985 | 0.8017. |
| Br. add'n | 36.3 | 61.5 | 58.3 | 73.9 | 95.7 | 87.9 | 100.3 | 51.6 | 33.2. |
| Residue: | | | | | | | | | |
| grams | 183 | 105 | 190 | 563 | 493 | 150 | 95 | 181 | 145. |
| Vis. S. U. at 210° F | 950 | 130.5 | 46.27 | 43.73 | 41.98 | 45.95 | 49.87 | 43.50 | 43.27. |
| V. I. | 50.5 | 58.5 | 126.2 | 131.7 | 137.3 | 137.3 | 132.0 | 122.6 | 129.1. |
| Pour, °F | +60 | +90 | −10 | −20 | −25 | −15 | −50 | −10 | +5. |
| Br. add'n | too dark | 12.0 | 14.3 | 17.2 | 19.2 | 15.2 | 12.1 | 14.4 | 12.8. |
| Refr. Index | do | too dark | 1.4822 | 1.4830 | 1.4714 | 1.4711 | 1.4701 | 1.4811 | 1.4768. |
| Spec. Grav | 0.9999 | 0.9759 | 0.8571 | 0.8649 | 0.8514 | 0.8458 | 0.8448 | 0.8633 | 0.8576. |
| N. N. | | 0.5 | 0.4 | 0.3 | 0.1 | 0.2 | 0.2 | 0.2 | 0.3. |

The process may be carried out as a batch, continuous or semi-continuous type of operation. Particularly when the process is carried out on a commercial scale, economic considerations make it preferable to operate in a continuous manner.

At the present time, the reaction mechanism involved in the process of the present invention is not fully understood. It seems probable that the reactions involve the free radical mechanism but beyond that it does not appear to be safe even to generalize.

The following detailed examples are for the purpose of illustrating modes of carrying out the process of this invention. It is to be understood, however, that the invention is not to be considered as limited to the specific mono-olefinic hydrocarbon reactants or the conditions of operation set forth therein. As will be apparent to those skilled in the art, a wide variety of other mono-olefinic hydrocarbon reactants may be used.

EXAMPLE

A typical reaction in accordance with this invention was accomplished as follows:

A shaker bomb was chilled and charged with decene-1 to the extent of 280 grams (2.0 mols) and with styrene to the extent of 52 grams (0.5 mol). The air therein was replaced with nitrogen and the bomb heated at 500° F. (260° C.) for four hours. The excess decene-1 was distilled out at atmospheric pressure, and 232 grams were recovered. Foaming was bad at atmospheric pressure and prohibitive under reduced pressure. The residue, topped at 175° C., vapor temperature (250° C., liquid temperature), amounted to 86 grams. The residual oil clouded on cooling but no substantial amount of polymer The following run was made using octene-1 and styrene:

*Table II*

Styrene:
  Grams _____ 26
  Mols _____ 0.25
Olefin _____ Octene-1
  Grams _____ 224
  Mols _____ 2.0
Atmosphere _____ $N_2$
Temp., °F. _____ 500
Time, hours _____ 10½
Max. press., lbs. _____ 200
Distillate:
  Grams _____ 85
  Gravity _____ 0.7279
  Br. add'n. _____ 134.6
Residue:
  Grams _____ 57
  Vis. S. U. at 210° F. _____ 48.75
  V. I. _____ 140.3
  Pour, °F. _____ −30
  Br. add'n. _____ 15.7
  Refr. index _____ 1.5101
  Specific gravity _____ 0.9117
  N. N. _____ 0.1

A number of additional runs were made in accordance with Example I by using temperatures below 500° F., or using mono-olefinic hydrocarbon reactants other than normal alpha-mono-olefins containing at least five carbon atoms per molecule, but results were in general unsatisfactory, many of the runs yielding resins or products of high pour points or products having low viscosity indices. A number of runs were also conducted in the presence of air rather than in the presence of an inert gas, but this also appeared generally to affect the products adversely, although in some instances, usable products were obtained in the presence of air. Excessive proportions of styrene also appeared to raise the pour point of the final product, and in some instances to result in the formation of resins. For convenience, the pertinent data of some of these additional runs are tabulated in Table III.

*Table III*

| Styrene: | | | | |
|---|---|---|---|---|
| grams | 20 [1] | 60 | 104 | 52. |
| mols | | | 1.0 | 0.5. |
| Olefin | Ethylene | Propylene | Isobutene | Butene 1. |
| grams | ([2]) | 42 | 119 | 336. |
| mols | | | 2.1 | 6.0. |
| Atmosphere | N₂ | N₂ | N₂ Evacuated | N₂. |
| Temp., °F | 640 | 625 | 650 | 600. |
| Time, hours | 10 | 10 | 8 | 10. |
| Max. press., p. s. i. g | 3,000 | 2,800 | 225 | 800. |
| Distillate, grams | 100 [3] | 155 | 49 | 65. |
| Residue: | | | | |
| grams | 15 [3] | 27 | 47 | 32. |
| Vis., cs. at 210° F | 6.77 | 28.45 | Resin [4] | Resin [4] |
| Vis. Index | 73.0 | Below Zero | | |
| Pour, °F | −25 | 15 | | |
| Carbon residue (Ramsbottom) | 0.04 | 1.6 | | |

[1] 100 grams n-pentane as solvent.
[2] Bomb pressured with ethylene gas, 1,000 lb. at 78° F.
[3] Bomb had been partially vented when pressure became excessive.
[4] Probably polystyrene without appreciable modification.

It will be apparent that the present invention provides an efficient and commercially feasible process for effecting the condensation of mono-olefinic hydrocarbons containing at least five carbon atoms with styrene. This process is of considerable value in the manufacture of synthetic lubricating oils, as well as in the manufacture of organic reaction products important as intermediates in organic synthesis.

From the characteristics of the products produced by the reaction process as described hereinbefore, it will be apparent that many of the products will be highly useful in reducing friction if placed between relatively moving parts, either alone or in combination with other materials. The products of this invention have been found to be readily blendable with other lubricating compositions.

The present invention may be embodied in other specific forms without departing from the spirit or essential attributes thereof, and it is therefore desired that the present embodiments be considered in all respects as illustrative and not restrictive, reference being had to the appended claims rather than the foregoing description to indicate the scope of the invention.

What is claimed is:

1. The method for preparing an oil of lubricating viscosity characterized by a viscosity index of at least about 100 and low pour point, which comprises: thermally and non-catalytically heating a charge consisting essentially of a straight chain normal, alpha mono-olefin having between five and about twelve carbon atoms and styrene, at a temperature from about 500° F., to about 700° F. for a period of time from about 10 hours to about one hour, respectively, the molar proportion of said normal, alpha mono-olefin in said charge being substantially greater than the molar proportion of styrene therein.

2. The method of claim 1 wherein the normal, alpha mono-olefin has between about eight and about twelve carbon atoms per molecule.

3. The method for preparing an oil of lubricating viscosity characterized by a viscosity index of at least about 100, which comprises: thermally and non-catalytically heating a charge consisting essentially of about one molecular proportion, a straight chain normal, alpha mono-olefin having between about eight and about twelve carbon atoms per molecule and about 0.6 to about 0.25 molecular proportion of styrene, at a temperature from about 500° F. to about 700° F. for a period of time from about ten hours to about one hour, respectively.

4. An oil of lubricating viscosity characterized by a viscosity index of at least about 100 and by a low pour point, and obtained by: thermally and non-catalytically heating a charge consisting essentially of a straight chain normal, alpha mono-olefin having between five and about twelve carbon atoms and styrene, at a temperature from about 500° F. to about 700° F. for a period of time from about ten hours to about one hour, respectively, the molar proportion of said normal, alpha mono-olefin in said charge being substantially greater than the molar proportion of styrene therein.

5. An oil as defined by claim 4 wherein the normal, alpha mono-olefine has between about eight and about twelve carbon atoms per molecule.

6. An oil of lubricating viscosity characterized by a viscosity index of at least about 100 and by a low pour point, and obtained by: thermally and non-catalytically heating a charge consisting essentially of about one molecular proportion of a straight chain normal, alpha mono-olefin having between about eight and about twelve carbon atoms per molecule and about 0.6 to about 0.25 molecular proportion of styrene, at a temperature from about 500° F. to about 700° F. for a period of time from about ten hours to about one hour, respectively.

7. An oil of lubricating viscosity characterized by a viscosity index of at least about 100 and by a low pour point, and obtained by: thermally and non-catalytically heating a charge consisting essentially of decene-1 and styrene at about 600° F. for about ten hours, the molar proportion of decene-1 in said charge being substantially greater than the molar proportion of styrene therein.

8. An oil of lubricating viscosity characterized by a viscosity index of at least about 100 and by a low pour point, and obtained by: thermally and non-catalytically heating a charge consisting essentially of octene-1 and styrene at about 500° F. for about ten hours, the molar proportion of octene-1 in said charge being substantially greater than the molar proportion of styrene therein.

FRANCIS M. SEGER.
ALEXANDER N. SACHANEN.

REFERENCES CITED

The following references are of record in the file of this patent:

UNITED STATES PATENTS

| Number | Name | Date |
|---|---|---|
| 2,111,831 | Batchelder et al. | Mar. 22, 1938 |
| 2,442,644 | Elwell et al. | June 1, 1948 |

Certificate of Correction

Patent No. 2,500,160            March 14, 1950

FRANCIS M. SEGER ET AL.

It is hereby certified that error appears in the printed specification of the above numbered patent requiring correction as follows:

Column 1, line 19, for the syllable "dition" read *ditions*; line 36, for the word "at" read *as*; column 2, line 5, for "obtain" read *obtained*; column 6, line 7, for "98.6" read *96.6*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*